Figure 1:
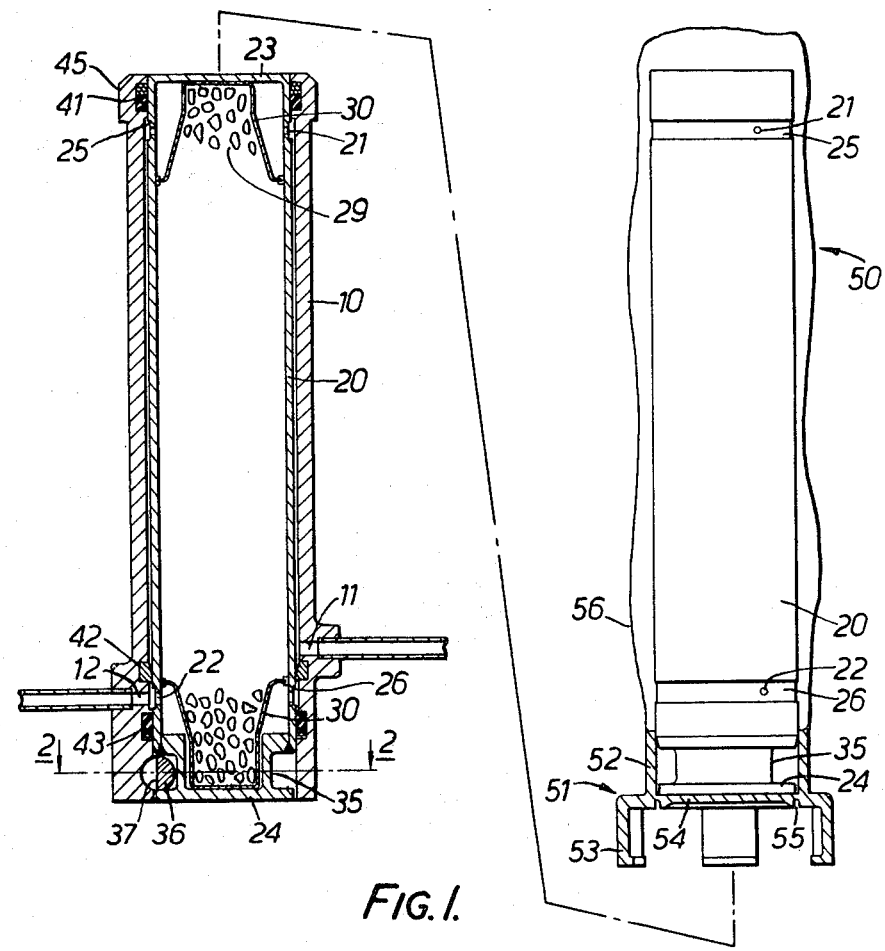

United States Patent

Ashley

[15] 3,683,596
[45] Aug. 15, 1972

[54] RECHARGEABLE GAS CLEANERS

[72] Inventor: Kenneth Ashley, Redditch, England

[73] Assignee: The Hymatic Engineering Company Limited, Redditch, England

[22] Filed: April 28, 1970

[21] Appl. No.: 32,655

[30] Foreign Application Priority Data

April 29, 1969    Great Britain..........21,738/69

[52] U.S. Cl. ..................55/359, 55/389, 55/481, 55/502
[51] Int. Cl. ..............................B01d 27/08
[58] Field of Search...............55/316, 359, 387–389, 55/478–481, 502; 62/480

[56] References Cited

UNITED STATES PATENTS

| | | |
|---|---|---|
| 1,706,594 | 3/1929 | Schiller et al.................55/349 |
| 2,728,407 | 12/1955 | Squier.......................55/359 |
| 3,186,148 | 6/1965 | Merrill et al................55/387 |
| 3,546,855 | 12/1970 | Marx.........................55/481 |
| 3,555,787 | 1/1971 | Lustig........................55/389 |

FOREIGN PATENTS OR APPLICATIONS 623,295   1/1963   Belgium......................55/490

Primary Examiner—Bernard Nozick
Attorney—Watson, Cole, Grindle & Watson

[57] ABSTRACT

A rechargeable gas cleaner, sealed against contamination from its surroundings, comprises a cartridge in a cylindrical casing open at both ends and having inlet and outlet ports in its cylindrical wall communicating through ports in the cartridge with cleaning material in the cartridge. For replacement a fresh cartridge is enclosed in a storage capsule comprising a flexible plastic bag and a rigid head incorporating a readily breakable diaphragm. The head of the capsule is applied to the casing and the cartridge pushed by means of the flexible bag into the casing, breaking the diaphragm and pushing the old cartridge out, followed by the diaphragm.

1 Claim, 2 Drawing Figures

PATENTED AUG 15 1972

3,683,596

INVENTOR
KENNETH ASHLEY
BY
Watson, Cole, Grindle & Watson
ATTORNEY

RECHARGEABLE GAS CLEANERS

This invention relates to rechargeable gas cleaners incorporating a charge of cleaning material such for example as absorbent or adsorbent material which may require replacement from time to time.

According to the present invention a rechargeable gas cleaner comprises a cylindrical casing open at both ends and having inlet and outlet ports in the interior of its cylindrical wall to co-operate with inlet and outlet ports in the outer cylindrical wall of a cartridge fitting within the casing and containing cleaning material, and, for replacing the cartridge, a fresh cartridge enclosed in a storage capsule in which it is sealed from the atmosphere and which is adapted to be applied end to end to the casing to form a continuation of it so that the new cartridge can be pushed from the storage capsule in to the casing, pushing out the old cartridge through the opposite end.

Conveniently the storage capsule may comprise a rigid head for application to the casing and a flexible bag enclosing the major part of the new cartridge so as to enable it to be pushed into the casing by collapsing the bag whilst sealing it from the outer atmosphere. The head of the storage capsule incorporates a readily breakable diaphragm which completes the sealing of the new cartridge during storage but can be readily broken by pushing on the cartridge and will then be carried completely through the casing and out at the other end.

The invention is particularly, though not exclusively, applicable to rechargeable gas cleaners for the gas supply to a cryogenic cooling apparatus of Joule Thomson type. In such an application the molecular sieve or zeolite gas purifying material becomes saturated after a period of use. Under convenient conditions the material can normally be reactivated, but under certain conditions in the field this may not be practicable and it may be necessary to replace it, and moreover to do so in very cramped and adverse conditions, for example exposed to foul weather by personnel who may themselves be dirty. The invention provides a means whereby the charge cannot, either in storage or while being inserted into the cleaner, become saturated with the impurities it is designed to remove, for example carbon dioxide, water, and hydrocarbon vapors.

Figure 2:
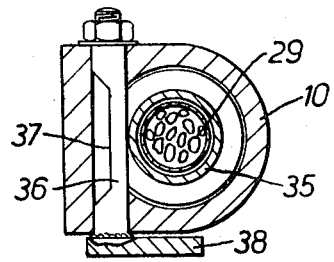

The invention may be put into practice in various ways but one specific embodiment will be briefly described by way of example with reference to the accompanying drawings in which:

FIG. 1 is a sectional side elevation of a rechargeable gas cleaner with a new, partially sectioned, cartridge containing a capsule positioned above it, and FIG. 2 is a sectional plan view on the line 2—2 of FIG. 1.

The rechargeable gas cleaner comprises a cylindrical casing 10 open at both ends and having inlet and outlet ports 11 and 12 in the interior of its cylindrical wall to co-operate with inlet and outlet ports 21 and 22 in the outer cylindrical wall of a cartridge 20 fitting within the casing. In the specific embodiment the cartridge comprises an elongated hollow cylinder having an integral closure 23 at one end and its other end closed by a welded-in locking stopper 224. The cylindrical wall of the cartridge has it its outer surface an annular recess 25 or 26 near each end communicating with the interior or through a number of holes to constitute the inlet and outlet ports 21 and 22. The cartridge contains a charge of absorbent or adsorbent powder 29 which is retained and kept clear of the ports by means of a generally frusto-conical perforated or foraminous retainer 30 near each end.

The locking stopper 24 has in its outer cylindrical surface an annular groove 35 and a locking pin 36 extends through the corresponding end of the casing with its axis at right angles to, but spaced from, that of the casing, and has a central portion 37 of semi-circular section and a small handle 38 at one end so that it can be turned through 180° so as to bring the semi-circular section portion of the pin into the annular groove of the stopper to retain the cartridge in position.

The casing incorporates three annular seals 41, 42 and 43 in its inner face one between the inlet and outlet ports and one between each port and the corresponding end of the casing.

The end seals 41 and 43 seal the interior of the cleaner from the atmosphere and must withstand the high pressure of the gas supplied to the cooler. The middle seal 42 merely serves to ensure that the gas follows the desired path through the cleaner and is not by passed between the inlet and outlet ports.

In the specific embodiment the inlet and outlet ports of the cartridge are near opposite ends, but whereas the outlet port of the casing is in line with the outlet port of the cartridge the inlet port of the casing is near the same end as the outlet port. Thus the middle seal is also near this end between the inlet and outlet ports of the casing and from the inlet port of the casing to the inlet port of the cartridge the casing is a slack fit round the cartridge so that the gas can flow from the casing port to the cartridge port.

At its end remote from the ports and stopper the casing is provided with a slightly raised circumferential rib 45 to receive the storage capsule 50 of a new cartridge during replacement, and a snap on rubber cap (not shown) at other times.

The capsule 50 comprises a rigid head 51 formed for example of a plastics material, in the form of a sleeve 52 one end of which is provided with a number of claws 53 to spring over the circumferential rib 45 at the end of the casing. This end of the sleeve is closed by a wall 54 surrounded by an annular groove 55 to form a readily breakable diaphragm against which the stopper 24 of the new cartridge bears. The remainder of the storage capsule is constituted by a flexible bag 56 of plastics material which, together with the sleeve 52 of the head and the readily breakable diaphragm 54 completely hermetically seals the new cartridge from the atmosphere.

Thus in order to replace the old cartridge by a new cartridge it is only necessary, after shutting off the pressure gas supply, to remove the rubber cap, turn the locking handle 38 to the released position, apply the head 51 of the new cartridge capsule to the end of the casing, and apply pressure to the end of the new cartridge through the flexible bag. This breaks the diaphragm 54, and, as the flexible bag collapses, pushes the new cartridge into the casing, ejecting the old cartridge from the opposite end where it will be followed by the breakable diaphragm. When the new cartridge reaches its working position the locking handle is turned through 180° to lock it in position, and the rubber cap is applied.

Thus it will be appreciated that during storage the new cartridge is hermetically sealed so that no contamination by the atmosphere is possible even over prolonged periods. Moreover the replacement of one cartridge by another is effected without exposing the new cartridge to the atmosphere or contact with surroundings, and indeed keeping it virtually sealed throughout the operation which in any event occurs very rapidly.

In a modified construction the seals 41, 42 and 43, instead of being carried by the inner surface of the casing of the cleaner, are carried by the outer surface of the cartridge. Thus a new set of seals is provided each time the cartridge is replaced.

What we claim as our invention and desire to secure by Letters Patent is:

1. A rechargeable gas cleaner comprising a cylindrical casing open at both ends and a cartridge fitting within the casing and containing cleaning material, releasable means on said casing for retaining said cartridge therein, said casing having inlet and outlet ports in the interior of its cylindrical wall and said cartridge having cooperating inlet and outlet ports in its cylindrical wall and, for replacing the said cartridge, a fresh identical cartridge enclosed in a storage capsule in which it is sealed from the atmosphere and which is adapted to be applied end to end to the casing to form a continuation of it so that the new cartridge can be pushed from the storage capsule into the casing, pushing out the old cartridge through the opposite end, said capsule comprising a rigid head at one end including means attaching said capsule to one end of the casing and a flexible bag connected to said rigid head and enclosing the major part of the new cartridge so as to enable it to be pushed into the casing by collapsing the bag while sealing it from the outer atmosphere, the head of the storage capsule incorporating a readily breakable diaphragm which completes the sealing of the new cartridge during storage but can be readily broken by pushing on the cartridge and will then be carried completely through the casing and out at the other end.

* * * * *